(12) United States Patent
Smolic et al.

(10) Patent No.: US 8,666,146 B1
(45) Date of Patent: Mar. 4, 2014

(54) DISCONTINUOUS WARPING FOR 2D-TO-3D CONVERSIONS

(75) Inventors: Aljosa A. Smolic, Zürich (CH); Manuel Lang, Zürich (CH); Alexander Hornung, Zürich (CH); Oliver Wang, Zürich (CH); Markus Gross, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 206 days.

(21) Appl. No.: 13/353,285

(22) Filed: Jan. 18, 2012

Related U.S. Application Data

(60) Provisional application No. 61/433,968, filed on Jan. 18, 2011.

(51) Int. Cl.
*G06K 9/00* (2006.01)

(52) U.S. Cl.
USPC ........... 382/154; 382/298; 382/162; 382/190; 348/43; 348/42

(58) Field of Classification Search
CPC .......... G06K 9/00208; G06K 9/00624; G06K 9/4671; G06T 2207/10012; G06T 5/003; G06T 7/0051; G06T 7/0075
USPC ............... 382/154, 298, 162, 190; 348/43, 42
See application file for complete search history.

(56) References Cited

U.S. PATENT DOCUMENTS

| | | | |
|---|---|---|---|
| 8,374,462 B2 * | 2/2013 | Jiang et al. ..................... | 382/298 |
| 2009/0219283 A1 | 9/2009 | Hendrickson et al. | |
| 2011/0074778 A1 | 3/2011 | Turner et al. | |
| 2011/0074784 A1 | 3/2011 | Turner et al. | |
| 2011/0074925 A1 | 3/2011 | Turner et al. | |
| 2011/0075922 A1 | 3/2011 | Turner et al. | |
| 2011/0109720 A1 * | 5/2011 | Smolic et al. ................... | 348/43 |
| 2011/0157155 A1 | 6/2011 | Turner et al. | |
| 2011/0158504 A1 | 6/2011 | Turner et al. | |

OTHER PUBLICATIONS

Avidan, S. and Shamir, A.; "Seam carving for content aware image resizing" *ACM Trans. Graph.*; 2007; vol. 26, No. 3, 9 pages.
Carroll, R. et al.; "Optimizing content-preserving projections for wide-angle images"; *ACM Trans. Graph.*; 2009; vol. 28, No. 3; 9 pages.
Carroll, R et al.; "Image warps for artistic perspective manipulation"; *ACM Trans. Graph.*; 2010; vol. 29, No. 4.; 9 pages.
Chen, S. E., and Williams, L; "View interpolation for image synthesis"; *SIGGRAPH '93 Proceedings of the 20th Annual Conference on Computer Graphics and Interactive Techniques*; 1993; pp. 279-288.

(Continued)

*Primary Examiner* — Mike Rahmjoo
(74) *Attorney, Agent, or Firm* — Kilpatrick Townsend & Stockton LLP

(57) ABSTRACT

Systems and methods for generating a stereoscopic pair of images from a monoscopic image input are described. At least one brushstroke input corresponding to a location in the monoscopic image is received. A saliency map and edge map of the monoscopic image are computed. A first image warp and a second image warp are computed using the at least one brushstroke, the saliency map, and the edge map. A stereoscopic pair of images are generated from the first image warp and the second image warp.

27 Claims, 9 Drawing Sheets

(5 of 9 Drawing Sheet(s) Filed in Color)

(56) References Cited

OTHER PUBLICATIONS

Comanducci, D et al.; "2D-to-3D photo rendering for 3D displays"; *Proc. of International Symposium on 3D Data Processing, Visualization and Transmission (3DPVT)*; 2010, 8 pages.

Didyk, P et al.; "Adaptive image-space stereo view synthesis"; *Vision, Modeling and Visualization*; 2010; pp. 299-306.

Goferman, S. et al.; "Context-aware saliency detection"; *Proceedings of the IEEE Conference on Computer Vision and Pattern Recognition*; 2010; vol. 33, pp. 2376-2383.

Guttmann, M. et al.; "Semiautomatic stereo extraction from video footage" *2009 IEEE 12th International Conference on Computer Vision*; 2009; pp. 136-142.

Harris, J. M., and Wilcox, L. M.; "The role of monocularly visible regions in depth and surface perception"; *Vision Research*; 2009; vol. 49, No. 22; pp. 2666-2685. Vision Research Special Issue—Vision Research Reviews.

Hoiem, D. et al.; "Automatic photo pop-up"; *ACM Trans. Graph.*; 2005; vol. 24, No. 3; pp. 577-584.

Knorr, S. et at; "Super-resolution stereo- and multi-view synthesis from monocular video sequences"; *6th International Conference on 3D Digital Imaging and Modeling 3DIM*; 2007; pp. 55-64.

Krähenbühl, P. et al.; "A system for retargeting of streaming video"; *ACM Trans. Graph.*; Dec. 2009; vol. 28, No. 5, Article 126; 10 pages.

Lang, M. et al.; "Nonlinear disparity mapping for stereoscopic 3D"; *ACM Trans. Graph.*; 2010; vol. 29, No. 4; 10 pages.

Levin, A. et at.; "Colorization using optimization"; *ACM Trans. Graph.*; 2004; vol. 23, No. 3; pp. 689-694.

Liu, F. et al.; "Content-preserving warps for 3d video stabilization"; *ACM Trans. Graph.*; 2009; vol. 28, No. 3; 9 pages.

Pritch, Y. et al.; "Shift-map image editing" *2009 IEEE 12th International Conference on Computer Vision (ICCV)*, 2009; pp. 151-158.

Rubenstein, M. et al.; "A comparative study of image retargeting"; *ACM Trans. Graph.*; Dec. 2010; vol. 29, No. 6; Article 160, 9 pages.

Shamir, A., and Sorkine, O.; "Visual media retargeting"; *SIGGRAPH Asia Courses*; 2009; Article No. 11; 13 pages.

Simakov, D. et al.; "Summarizing visual data using bidirectional similarity"; *IEEE Conference on Computer Vision and Patern Recognition (CVPR)*; 2008; 8 pages.

Sỳkora, D. et al.; "Adding depth to cartoons using sparse depth (in)equalities"; *Comput. Graph. Forum*; 2010; vol. 29, No. 2; pp. 615-623.

Van Den Hengel, A. et al.; "Videotrace: rapid interactive scene modelling from video"; *ACM Trans. Graph.*; 2007; vol. 26, No. 3, Article 86; 6 pages.

Ward, B. et al.; "Depth director: A system for adding depth to movies"; *IEEE Computer Graphics and Applications*; 2011; vol. 31; pp. 36-48.

Wei, L.-Y. et al.; "State of the art in example-based texture synthesis"; *Eurographics 2009, State of the Art Report, EG-STAR*, 2009; 25 pages; Eurographics Association.

Zhang, L. et al.; "Single view modeling of free-form scenes"; *Proceedings of IEEE Computer Society Conference on Computer Vision and Pattern Recognition*; 2001; pp. 990-997.

Zhang, L. et al.; "Stereoscopic image generation based on depth images"; *2004 International Conference on Image Processing (ICIP)*; 2004; pp. 2993-2996.

Zhang, G. et al.; "Stereoscopic video synthesis from a monocular video"; *IEEE Transactions on Visualization and Computer Graphics*; Jul./Aug. 2007; vol. 13, No. 4; pp. 686-696.

Zheng, K. C. et al.; "Layered depth panoramas"; *IEEE Conference on Computer Vision and Pattern Recognition*, 2007; 8 pages.

Zitnick, C. L et al.; "High-quality video view interpolation using a layered representation"; *ACM Trans. Graph.*; 2004; vol. 23, No. 3; pp. 600-608.

Zwicker, M et al.; "EWA splatting"; *IEEE Transactions on Visualization and Computer Graphics*; 2002; vol. 8, No. 3; pp. 223-238.

\* cited by examiner

DISCONTINUOUS WARPING FOR 2D-TO-3D CONVERSIONS

CROSS-REFERENCES TO RELATED APPLICATION

The present application claims benefit of priority under 35 U.S.C. §119(e) of Provisional Patent Application No. 61/433,968, filed on Jan. 18, 2011, titled "Discontinuous Warping For 2D-To-3D Conversions," the entire contents of which are herein incorporated by reference for all purposes.

FIELD OF THE INVENTION

The present disclosure relates generally to conversion of a monoscopic image into a stereoscopic pair of images and more specifically to an interactive workflow for using brushstroke depth cues, edge-aware disparity mapping, and content-and-disparity aware disocclusion filling to generate the stereoscopic pair of images.

BACKGROUND

Stereoscopic ("three-dimensional" or "3D") motion pictures were initially created by capturing content with two cameras. However, this technique typically requires costly equipment, such as a dual-camera rig. Further, error correction needed for the resulting 3D content may result in a cumbersome process.

An alternative technique for creating stereoscopic motion pictures involves generating a pair of stereoscopic images from a monoscopic ("two-dimensional" or "2D") image. The pair of stereoscopic images may present differing perspectives of the monoscopic image such that an illusion of depth is created for a viewer looking at one of the pair of images with the left eye and the other image of the pair with the right eye. Typically, a 3D viewing device, such as glasses with polarizing, anaglyphic or alternating shutter features, are used to view the stereoscopic pair of images.

Many techniques for 2D-to-3D image conversion require extensive manual editing processes. For example, artists perform inpainting by hand to fill missing image content in regions of the 3D image where disocclusions exist due to the pixel displacement introduced in the 2D-to-3D conversion process. Moreover, existing conversion techniques may involve different artists using different software packages and production tools, with the resulting 3D image viewable only after the conversion process is complete.

In view of the above, improved methods and apparatus for 2D-to-3D image conversion are desired.

REFERENCES

Examples of previous approaches and general description of problems and terminology in this space can be found in the literature, such as the references cited below:

[Avidan] Avidan, S., and Shamir, A. 2007. Seam carving for content aware image resizing. *ACM Trans. Graph.* 26, 3, 10.
[Caroll] Carroll, R., Agrawala, M., and Agarwala, A. 2009. Optimizing content-preserving projections for wide-angle images. *ACM Trans. Graph.* 28, 3.
[Caroll II] Carroll, R., Agarwala, A. and Agrawala, M. 2010. Image warps for artistic perspective manipulation. *ACM Trans. Graph.* 29, 4.
[Chen] Chen, S. E., and Williams, L. 1993. View interpolation for image synthesis. In *SIGGRAPH*, 279-288.
[Comanducci] Comanducci, D., Maki, A., Colombo, C., and Cipolla, R. 2010. 2d-to-3d photo rendering for 3d displays. In *Proc. of International Symposium on 3D Data Processing, Visualization and Transmission (3DPVT)*.
[Didyk] Didyk, P., Ritschel, T., Eisemann, E., Myszkowski, K., and Seidel, H.-P. 2010. Adaptive image-space stereo view synthesis. In *VMV Workshop*, 299-306.
[Goferman] Goferman, S., Zelnik-Manor, L., and Tal, A. 2010. Context-aware saliency detection. In *CVPR*, 2376-2383.
[Guttmann] Guttmann, M., Wolf, L., and Cohen-Or, D. 2009. Semiautomatic stereo extraction from video footage. In *Computer Vision, 2009 IEEE 12th International Conference on*, 136-142.
[Harris] Harris, J. M., and Wilcox, L. M. 2009. The role of monocularly visible regions in depth and surface perception. *Vision Research* 49, 22, 2666-2685. Vision Research Special Issue—Vision Research Reviews.
[Hoiem] Hoiem, D., Efros, A. A., and Herbert, M. 2005. Automatic photo pop-up. *ACM Trans. Graph.* 24, 3,577-584.
[Knorr] Knorr, S., Kunter, M., and Shikora, T. 2007. Super-resolution stereo- and multi-view synthesis from monocular video sequences. In *3DIM*, 55-64.
[Krähenbühl] Krähenbühl, P., Lang, M., Hornung, A., and Gross, M. H. 2009. A system for retargeting of streaming video. *ACM Trans. Graph.* 28, 5.
[Lang] Lang, M., Hornung, A., Wang, O., Poulakos, S., Smolic, A., and Gross, M. H. 2010. Nonlinear disparity mapping for stereoscopic 3d. *ACM Trans. Graph.* 29, 4.
[Levin] Levin, A., Lishinski, D., and Weiss, Y. 2004. Colorization using optimization. *ACM Trans. Graph.* 23, 3,689-694.
[Liu] Liu, F., Gleicher, M., Jin, H., and Agarwala, A. 2009. Content-preserving warps for 3d video stabilization. *ACM Trans. Graph.* 28, 3.
[Pritch] Pritch, Y., Kav-Venaki, E., and Peleg, S. 2009. Shift-map image editing. In *ICCV'09*, 151-158.
[Rubinstein] Rubenstein, M., Gutierrez, D., Sorkine, O., and Shamir, A. 2010. A comparative study of image retargeting. *ACM Trans. Graph.* 29, 5, to appear.
[Shamir] Shamir, A., and Sorkine, 0. 2009. Visual media retargeting. In *SIGGRAPH ASIA Courses*.
[Simakov] Simakov, D., Caspi, Y., Shechtman, E., and Irani, M. 2008. Summarizing visual data using bidirectional similarity. In *CVPR*.
[Sýkora] Sýkora, D., Sedlacek, D., Jinchao, S., Dingliana, J., and Collins, S. 2010. Adding depth to cartoons using sparse depth (in)equalities. *Comput. Graph. Forum* 29, 2, 615-623.
[Van Den Hengel] Van Den HEengel, A., Dick, A. R., Thormählen, T., Ward, B., and Torr, P. H. S. 2007. Videotrace: rapid interactive scene modelling from video. *ACM Trans. Graph.* 26, 3, 86.
[Ward] Ward, B., Kang, S. B., and Bennett, E. P. 2011. Depth director: A system for adding depth to movies. *IEEE Computer Graphics and Applications* 31, 36-48.
[Wei] Wei, L.-Y., Lefebvre, S., Kwatra, V., and Turk, G. 2009. State of the art in example-based texture synthesis. In *Eurographics 2009, State of the Art Report, EG-STAR*, Eurographics Association.
[Zhang] Zhang, L., Dugas-Phocion, G., Samson, J.-S., and Seitz, S. M. 2001. Single view modeling of free-form scenes. In *CVPR* (1), 990-997.
[Zhang] Zhang, L., Tam, W. J., and Wang, D. 2004. Stereoscopic image generation based on depth images. In *ICIP*, 2993-2996.

[Zhang] Zhang, G., Hua, W., Qin, X., Wong, T.-T., and Bao, H. 2007. Stereoscopic video synthesis from a monocular video. *IEEE Trans. Vis. Comput. Graph.* 13, 4,686-696.

[Zheng] Zheng, K. C., Kang, S. B., Cohen, M. F., and Szeliski, R. 2007. Layered depth panoramas. In *CVPR*.

[Zitnick] Zitnick, C. L., Kang, S. B., Uyttendaele, M., Winder, S. A. J., and SZELISKI, R. 2004. High-quality video view interpolation using a layered representation. *ACM Trans. Graph.* 23, 3,600-608.

[Zwicker] Zwicker, M., Pfister, H., Van Baar, J., and Gross, M. H. 2002. Ewa splatting. *IEEE Trans. Vis. Comput. Graph.* 8, 3,223-238.

BRIEF SUMMARY

A stereoscopic pair of images is generated from a monoscopic input image, based on brushstroke depth cues applied to the monoscopic image, a saliency map of the monoscopic image, and an edge map of the monoscopic image. The stereoscopic images present an illusion of depth when viewed with a 3D viewing device.

In a specific aspect, at least one brushstroke input corresponding to a location in the monoscopic image is received. A saliency map and edge map of the monoscopic image are computed. A first image warp and a second image warp are computed using the at least one brushstroke, the saliency map, and the edge map. A stereoscopic pair of images are generated from the first image warp and the second image warp.

In another specific aspect, a computer-implemented image conversion system for generating a stereoscopic pair of images from a monoscopic image comprises a processor, a memory, a display, and an input device.

In a further specific aspect, a computer readable medium for use with a computer-implemented image conversion system has program code executable by a processor. The program code comprises program code for receiving a monoscopic image, program code for receiving a first brushstroke input corresponding to a location in the monoscopic image, program code for computing a saliency map of the monoscopic image, program code for computing an edge map of the monoscopic image, program code for computing a first image warp defining a movement of each pixel of the monoscopic image, program code for computing a second image warp defining a movement of each pixel of the monoscopic image, and program code for generating the stereoscopic pair from the first image warp and the second image warp. The first image warp and the second image warp are computed using the first brushstroke input, the saliency map, and the edge map.

In computing the first image warp and the second image warp, disocclusions may be filled by stretching content that is proximate to a disoccluded region to a border of the disoccluded region.

The stereoscopic pair of images may be displayed to a user for 3D viewing. A user interface may be configured to receive an intensity corresponding to a depth of the area of the monoscopic image indicated by the first input. The user interface may also receive one or more of a modified first input, a second input to modify a saliency map, and a third input to modify an edge map. A new stereoscopic pair of images may be computed and displayed to the user after modified input is provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
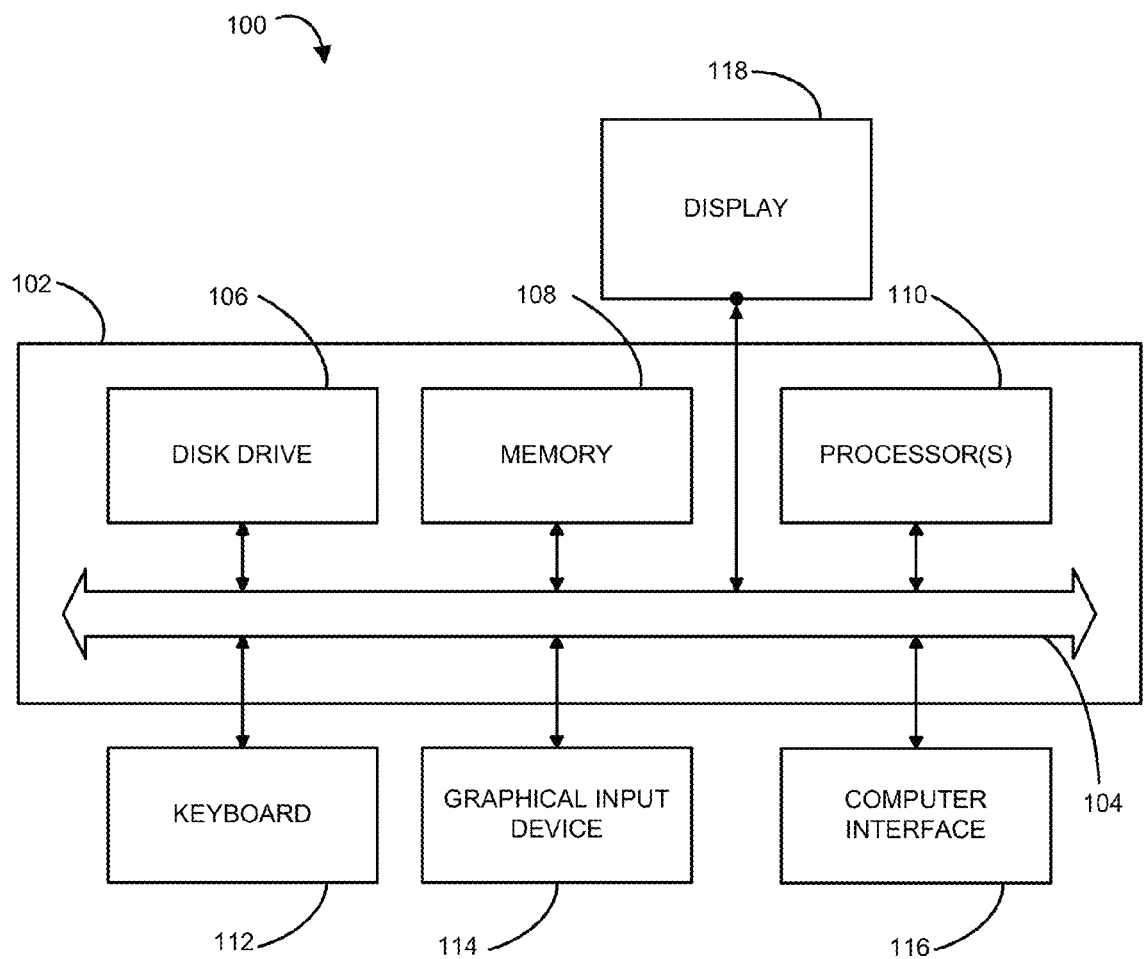
FIG. 1 is an illustrative block diagram of an artist editing station.

An improved system, method, apparatus and program code for 2D-to-3D image conversion is described herein. Such a system can be used to create a stereoscopic pair of images or a series of stereoscopic pairs for a motion picture sequence of images. The pair of images, when viewed with a 3D viewing device, convey an impression of depth to the viewer.

The 2D-to-3D conversion approach described herein provides for user interaction via brushstroke input in the image domain. Because the workflow is not limited by perspective projection restrictions, such as a geometrically consistent scene and camera model, the approach allows for conversion of non-realistic animated content and artistic modification of scene depth.

An artist editing station (such as the station 100 in FIG. 1) displays a 2D image for annotation by a user. The user annotates the image with brushstroke input, also referred to as "scribbles" or "sparse scribbles," to provide depth cues. Brushstroke depth cues are used to indicate the relative depth of various portions of the image. For example, a brushstroke having a higher intensity may be used to indicate a portion of an image that is to be perceived by a viewer as being closer to the viewer, and a brushstroke having a lower intensity may be used to indicate a portion of an image that is to be perceived by the viewer as being further away from the viewer. The annotated 2D image and resulting 3D image may be displayed to the user. If modifications to the image are desired, the user may modify the brushstrokes and view the resulting modified 3D image. The user may also edit a saliency map of the image and an edge map of the image using brushstroke input, using a similar interactive process.

The disparity cues, edge map, and saliency map are used to compute 1) a first image warp used to create a first stereoscopic image and 2) a second image warp used to create a second stereoscopic image. Each image warp defines a horizontal movement ("disparity") for each pixel of the 2D image. In contrast to conversion techniques that involve production of a dense depth map in which each pixel of an image is assigned a depth value, the conversion approach described herein uses brushstroke depth cues to create a disparity hypothesis that is used as a soft constraint in an optimization algorithm. The warping method is discontinuous, resulting in sharp disparity boundaries which allow objects to appear to "pop out" of a scene.

The disparity hypothesis generated based on the depth cues may result in artifacts at locations with errors in the disparity hypothesis and holes ("disocclusions") that are visible when the two images of the stereoscopic pair are viewed with a 3D viewing device. In the approach described herein, background image content that is near to the disocclusion is stretched to fill the disocclusion. A saliency map of an image is used to determine where background (low saliency) content is located within an image. A smoothness term is used to direct errors and to determine which parts of a scene can be stretched for filling disocclusions. The smoothness terms penalizes local distortions, weighted by the saliency, except at discontinuity locations, which are represented by an edge map.

In a single optimization process, depth cues provided by a user and edge map data generated for an image are used to produce a disparity hypothesis that is used as a confidence-weighted soft-constraint combined with a saliency-weighted discontinuity-preserving smoothness term. A content-and-disparity-aware resizing method is used to stretch background regions and fill in disocclusions.

Referring now to FIG. 1, an illustrative block diagram of an artist editing station 100 is shown. Artist editing station 100 is capable of displaying an image and receiving brushstroke input. For example, the artist editing station 100 may be a general purpose computer 102 communicatively coupled to one or more input devices 114 and one or more displays 118. In another example, the artist editing station 100 may be a tablet with an integrated touchscreen display capable of receiving user input such as by a finger or a stylus. The computer 102 may be a series of networked computers.

Artist editing station 100 comprises a computer 102 which typically includes computer components such as one or more disk drives 106, memory storage devices 108, processors 110, and system bus 104 interconnecting the above components. Memory 108 may be random access memory (RAM) or other memory capable of storing computer instructions to be executed by one or more processors 110 as a mechanism for effecting some functionality herein that is implemented in software. Memory 108 and disk drive 106 are examples of computer readable tangible media configured to store computer executable code for implementing techniques described herein. Additionally, memory 108 and disk drive 106 may be used to store data such as 2D image files, 2D motion picture files, 3D image files, 3D motion picture files, object/scene models including geometric descriptions of objects, metadata about images and user inputs, procedural descriptions, a rendering engine, and the like. Other types of tangible media may include magnetic storage media such as floppy disks, networked hard disks, removable hard disks, optical storage media such as CDs and DVDs, holographic memories, semiconductor memories such as flash memories, read only memories (ROMs), battery backed volatile memories, and the like. Processors 110 may include one or more of a central processing unit (CPU) and a graphical processing unit (GPU).

The artist editing station 100 may further include keyboard 112 and computer interface 116. Computer interfaces 116 typically include an Ethernet card, a modem, (asynchronous) digital describer line (ADSL or DSL) unit, FireWire interface, USB interface, and the like. For example, computer interface 116 may be coupled to a computer network. Computer interface 116 may be physically integrated on the motherboard of computer 102 and/or include software drivers, or the like.

Images can be input using a scanner, received over a computer interface 116 or other interface, stored in memory 108 or disk storage 106, or drawn directly into the system via graphical input device 114. Graphical input device 114 may include one or more of the following: a computer mouse, trackball, track pad, joystick, wireless remote, drawing tablet, voice command system, eye tracking system, a stylus, or the like that allows the artist to draw brushstroke images relative to an image. The graphical input device 114 typically allows a user to select objects, icons, text and the like that appear on the display 118 via a command such as a click of a button or the like as well as making moving inputs, such as signaling a curve or association of objects, drawing lines, etc.

A 2D image is displayed on display 118. Brushstroke input is entered by the user with input device 114. The brushstroke input is displayed relative to the image on display 118. A 2D-to-3D conversion algorithm is applied to the 2D image, and the resulting 3D image is displayed on display 118. The conversion algorithm may be stored in memory 108 or disk drive 106 and implemented by processor 110. The 2D image and brushstroke data may be sent to a remote device via computer interface 116; the conversion algorithm is applied to the 2D image by the remote device; and the remote device transmits the resulting 3D image to artist editing station 100 to be displayed on display 118.

Figure 2A:
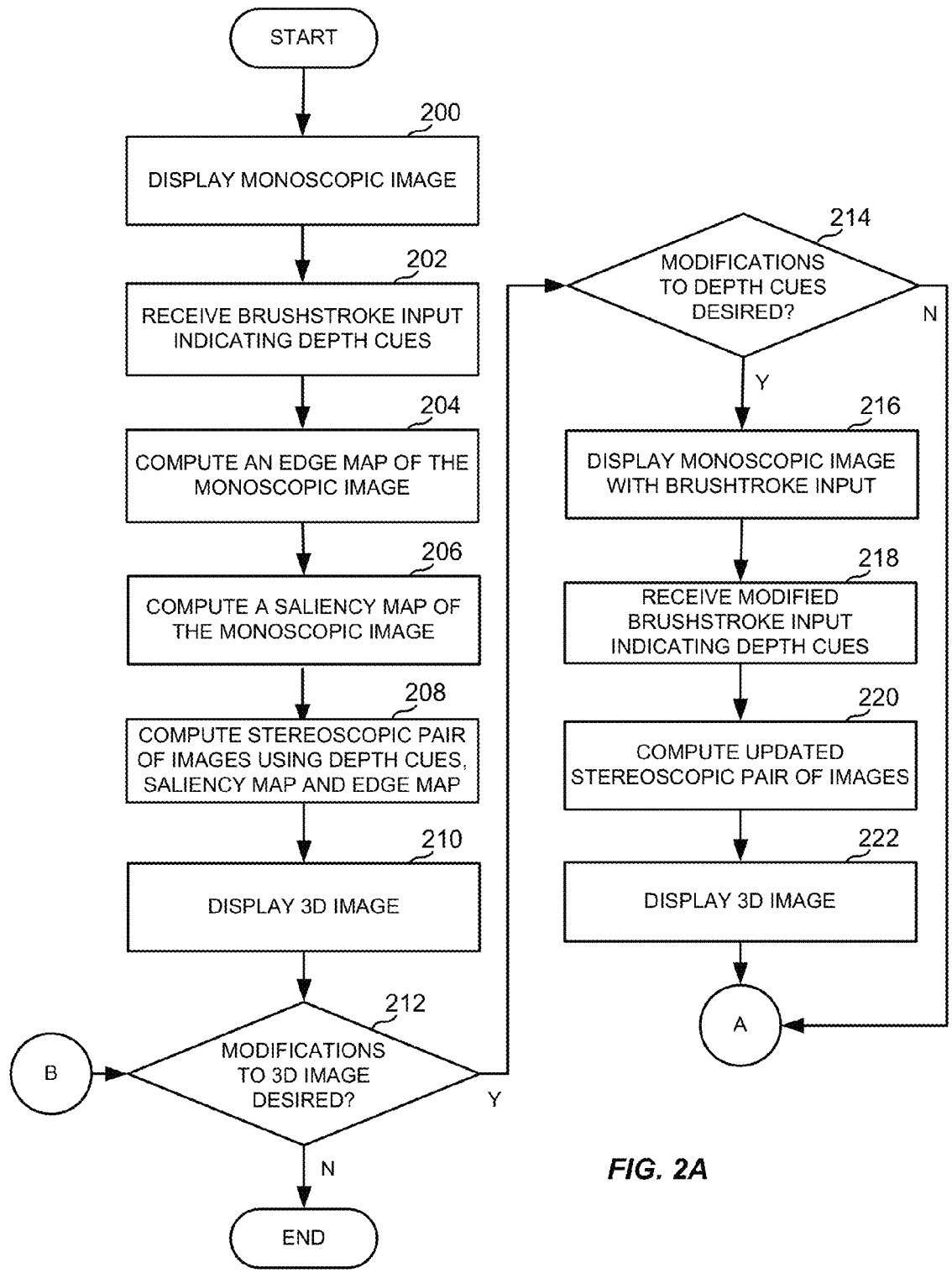
FIGS. 2A-2B show an illustrative flow diagram for 2D-to-3D conversion.
Figure 2B:
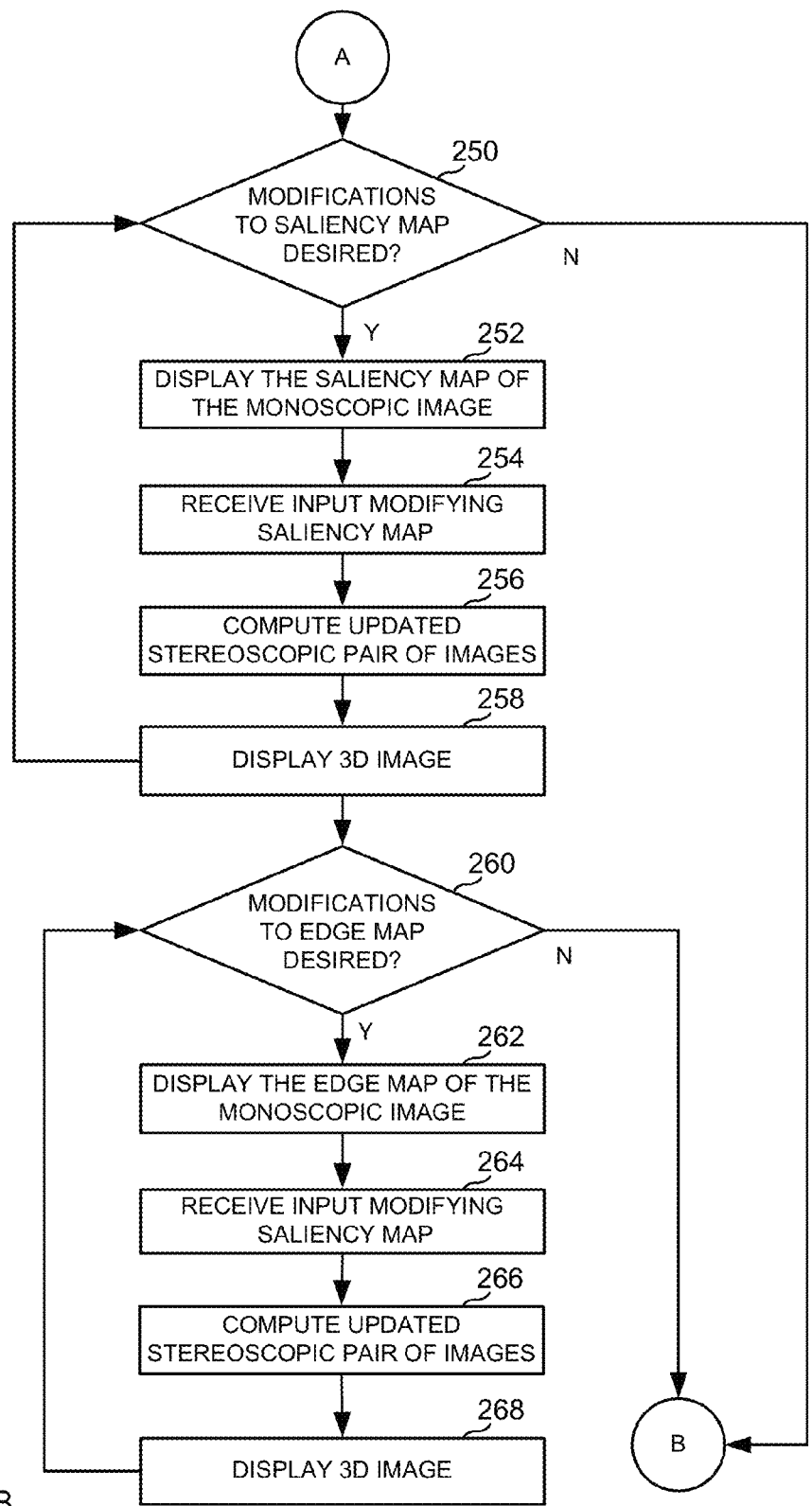

Referring now to FIGS. 2A-2B, an illustrative flow diagram for 2D-to-3D conversion is shown. The 2D-to-3D conversion generates a pair of stereoscopic images from a monoscopic image input. At operation 200, a monoscopic image is displayed on display 118 of artist editing station 100. At operation 202, brushstroke input provided via graphical input device 114 is received by the artist editing station 100. The brushstroke input received at operation 202 is used to provide depth cues which indicate the relative desired perceived depth of various parts of the image. At operations 204-206, computer code executed by computer 102 performs various operations involved in the conversion. In an alternative example, a remote computer communicatively coupled to computer 102 performs the operations involved in the conversion.

At operation 204, an edge map of the monoscopic image is computed. The edge map is an image showing the edges of the monoscopic image as detected by an edge detection algorithm.

At operation 206, a saliency map of the monoscopic image is computed. A saliency map is a topographical map indicating the visual saliency of each pixel of an image.

At operation 208, a stereoscopic pair of images is computed using the brushstroke input, edge map, and saliency map. The algorithm used to compute the stereoscopic pair of images is described in further detail below. At operation 210, the stereoscopic pair of images are displayed on display 118. The stereoscopic pair of images can be viewed as a 3D image using a 3D viewing device. If modifications to the 3D image are desired, as indicated at operation 212, the user may make modifications to the depth cues, edge map, or saliency map, as indicated at operations 214, 250, and 260, respectively. The user may make modifications to one or more of the depth cues, edge map or saliency map before the stereoscopic pair of images is created.

Figure 3:
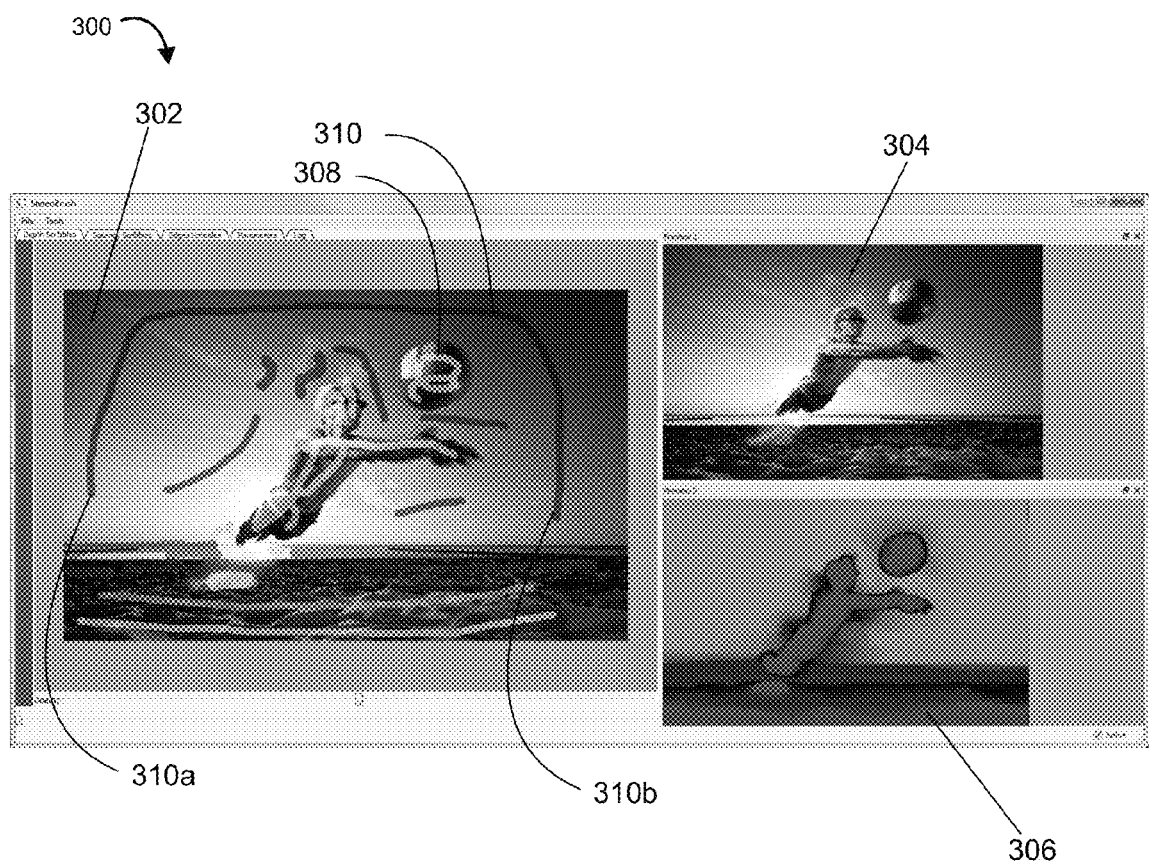
FIG. 3 shows an illustrative graphical user interface for displaying brushstroke input relative to a monoscopic image.

At operation 214, if modifications to the depth cues are desired, the monoscopic image is displayed with brushstroke depth cues shown relative to the monoscopic image, as indicated at operation 216. Modified brushstroke input provided via graphical input device 114 is received by the artist editing station 100, as indicated at operation 218. A new pair of stereoscopic images may be computed based on the modified brushstroke input, as indicated at operation 220, and the stereoscopic pair of images are displayed on display 118 to allow viewing of the resulting modified 3D image, as indicated at operation 222. A visualization of disparity resulting from the disparity cues provided or another image may be shown on display 118 in addition to or in lieu of the 3D image at operation 222. FIG. 3 shows an illustrative graphical user interface for displaying brushstroke input relative to a monoscopic image. If the user wishes to make further modifications to the depth cues, the monoscopic image with brushstroke depth cues is again displayed as indicated at operations 214-216. In this manner, the user may interactively modify the brushstroke depth cues and view the resulting 3D image until the desired depth effect is achieved.

Continuing to FIG. 2B, at operation 250, if modifications to the saliency map are desired, the saliency map of the monoscopic image is displayed, as indicated at operation 252. The user may modify the saliency map image using brushstroke input. As the input to modify the saliency map is received, as indicated at operation 254, the saliency map as modified by the received input is displayed. When the modifications are complete, a new pair of stereoscopic images may be computed based on the modified saliency map, as indicated at operation 256, and displayed on display 118 for 3D viewing, as indicated at operation 258. If further modifications to the saliency map are desired, the saliency map is displayed to receive further modifications. In this manner, the user may interactively modify the saliency map and view the resulting 3D image until the desired effect is achieved.

At operation 260, if modifications to the edge map are desired, the edge map of the monoscopic image is displayed, as indicated at operation 262. The user may modify the edge map image using brushstroke input. As the input to modify the edge map is received, as indicated at operation 264, the edge map as modified by the received input is displayed. When the modifications are complete, a new pair of stereoscopic images may be computed based on the modified edge map, as indicated at operation 266, and displayed on display 118 for 3D viewing, as indicated at operation 268. If further modifications to the edge map are desired, the edge map is displayed to receive further modifications. In this manner, the user may interactively modify the edge map and view the resulting 3D image until the desired effect is achieved.

Referring now to FIG. 3, an illustrative graphical user interface (GUI) 300 for displaying brushstroke input relative to a monoscopic image 302 is shown. The GUI may also display a 3D image 304, and a disparity visualization 306. The GUI may be shown, for example, on display 118 of artist editing station 100. Illustrative brushstroke input depth cues 308 and 310 are shown relative to monoscopic image 302. A brushstroke may be a point of a displayed image selected by a graphical input device 114 or a trail created by the graphical input device as the input device or a pointer of the input device moves between two points of a displayed image. For example, the brushstroke shown at 310 may be created when a user applies a stylus to display showing monoscopic image 302 at point 310a, and the user moves the stylus between point 310a and point 310b before lifting the stylus from the display. The brushstroke shown at 310 may be created when a user presses a mouse button at point 310a and continues to hold down the mouse button while tracing a path from point 310a to point 310b, releasing the mouse button at point 310b.

The brushstroke may have a brushstroke profile of one or more pixel. A brushstroke profile having multiple pixels may be available in various configurations (e.g., a circular brushstroke profile, a square brushstroke profile, etc.). The user may be able to select a brushstroke profile from a menu indicating multiple available brushstroke profiles. The GUI shown in FIG. 3 may allow users to provide digital brushstroke input with a standard brush, as well as a gradient brush, which may be useful for surfaces with smooth depth variation.

One or more parameters associated with the brushstroke input may be used to indicate information related to the desired perceived depth of the area of the monoscopic image indicated by the brushstroke. For example, a darker ("lower intensity") brushstroke input may be used to indicate a portion of the image that the user desires to be perceived by the viewer as being further from the viewer, and a lighter ("higher intensity") brushstroke image may be used to indicate a portion of the image the user desires to be perceived by the viewer as being closer to the viewer. In the illustrative example of FIG. 3, a lighter brushstroke depth cue 308 is used to indicate that the ball is to be perceived as being closer to the viewer, while a darker brushstroke depth cue 310 is used to indicate that the sky is to be perceived as being further away from the viewer. After the brushstroke input has been entered, the user may interactively indicate the depth of the brushstroke input by changing at least one parameter associated with the brushstroke. The interactive modification of brushstroke input may occur while the user views the result in 3D, allowing the user to settle on a desired perceptual effect of each stroke. The stereoscopic images are computed using the brushstroke depth cues.

The user may modify the brushstrokes by providing modified brushstroke input relative to monoscopic image 302. One or more of 3D image 304 and disparity visualization 306 may be updated automatically each time a brushstroke is completed. Alternatively, one or more of 3D image 304 and disparity visualization 306 may be updated periodically as brushstroke input is provided. In an alternative approach, the user provides a command to update one or more of 3D image 304 and disparity visualization 306 after completing modifications to the brushstroke input. In this manner, the user can view the effect of changes made to brushstroke input on the 3D output. The 3D image shown at 304 includes a stereoscopic pair of images computed using the brushstroke input. The disparity visualization 306 is an image that indicates a per-pixel disparity hypothesis used as a soft constraint in computing the stereoscopic pair of images. The disparity visualization may be calculated using the brushstroke depth cues and additional information, such as edge map data.

Figure 4A:
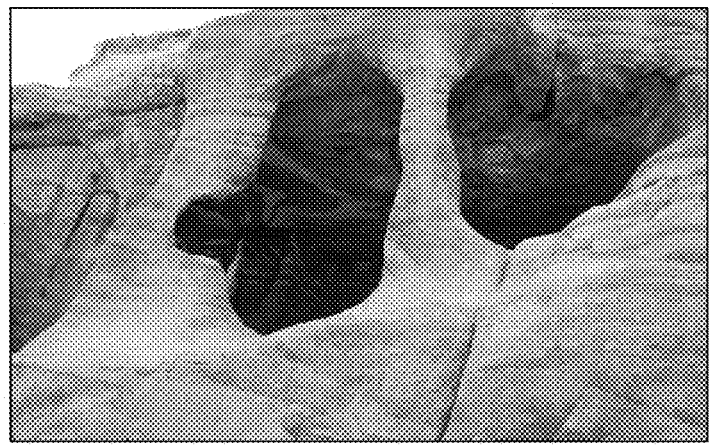
FIGS. 4A-4C show an illustrative edge map and edge-aware disparity map of a monoscopic image.
Figure 4B:
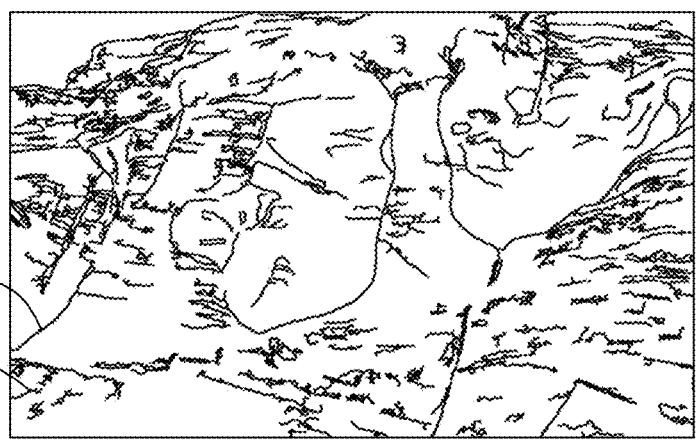
Figure 4C:
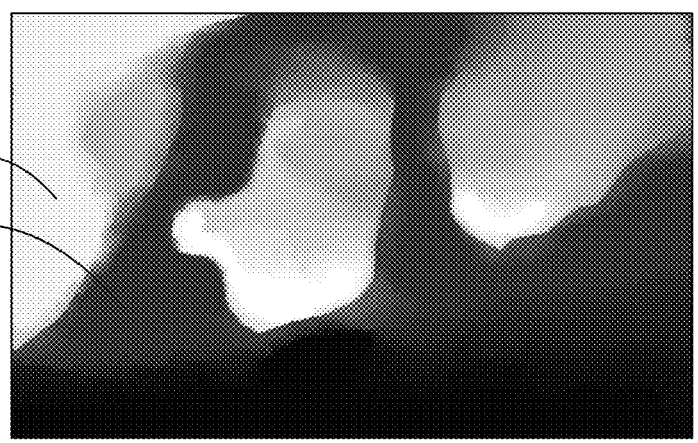

Referring now to FIGS. 4A-4C, illustrative monoscopic image 400 is shown in FIG. 4A, an edge map 410 of monoscopic image 400 is shown in FIG. 4B, and disparity map 420 calculated using edge map 410 is shown in FIG. 4C. Edge map 410 is produced by applying an edge detection algorithm to image 400, such as an algorithm that detects points in the image at which the image brightness changes sharply. In one example, a binary edge map is computed. The edge map is used to locate boundaries delineating objects within the image. For example, the edge map may be used in combination with the brushstroke depth cues to determine a boundary of an object or area in which depth cues have been placed. In an illustrative example, in FIG. 3, an edge map may be used to detect the boundary of the ball in which brushstroke 308 is placed.

As can be seen from FIG. 4B, an edge detection algorithm may "overdetect" edges by identifying both boundaries delineating objects of interest in the 2D-to-3D conversion and edges that are not relevant to the 2D-to-3D conversion. For example, in edge map 410, the wall of a rock formation as shown by edge 412 will likely be the boundary between an area 422 that will be perceived as being relatively distant from the viewer and area 424 that will be perceived as being relatively close to the user. In contrast, edge 414 will likely not be a boundary between a close object and a distant object as perceived by a viewer. Disparity map 420 illustrates how the 2D-to-3D conversion approach applied herein is robust to over-detection of edges, as edges such as 414 are likely not taken into account whereas edges such as 412 are clearly visible in disparity map 420.

In an interface similar to the GUI of FIG. 3, the user may edit edge map 410 using an input device such as graphical input device 114. For example, the user may "erase" unnecessary edges shown in the edge map or add corrections where necessary discontinuities cannot be detected by image edges using brushstroke input.

Figure 5A:
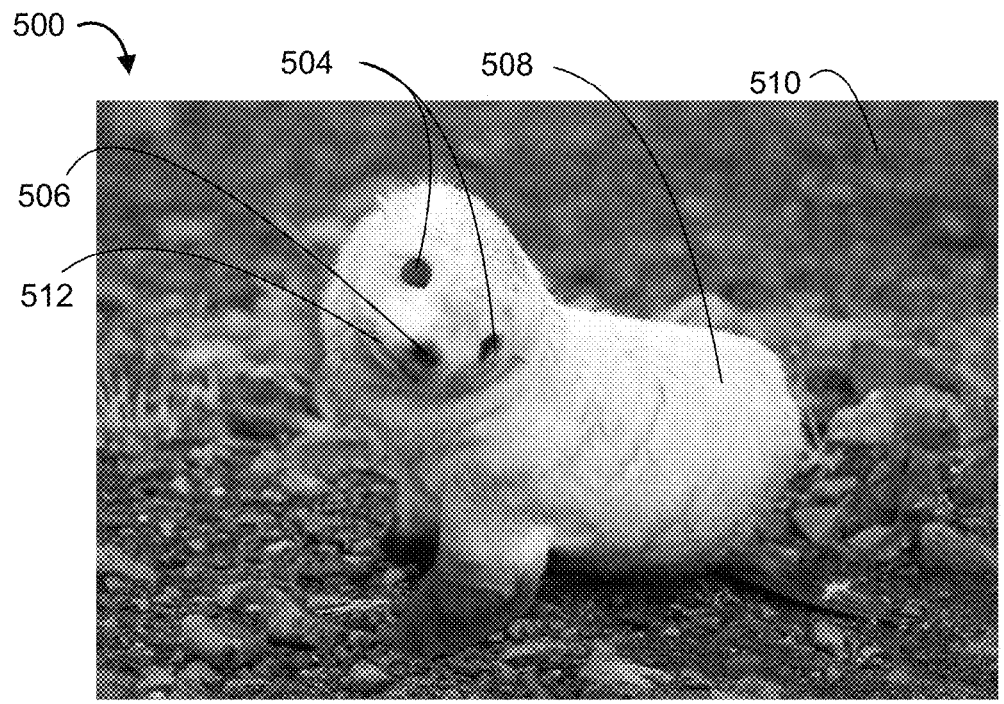
FIGS. 5A-5B show an illustrative saliency map of a monoscopic image.
Figure 5B:
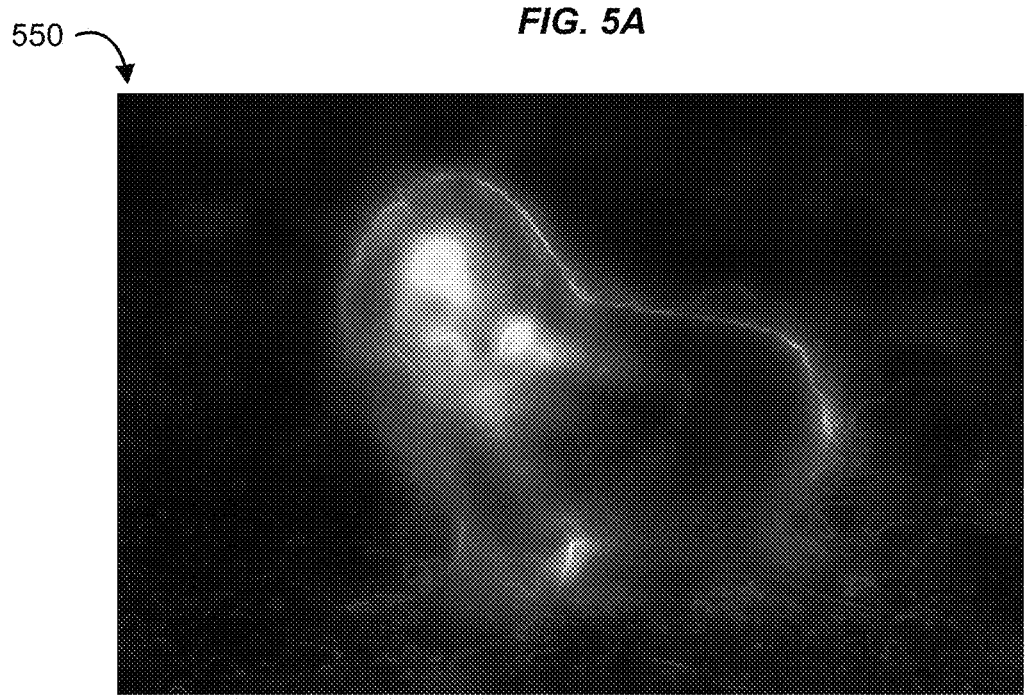
Figures 6A, 6B, 6C, 6D:
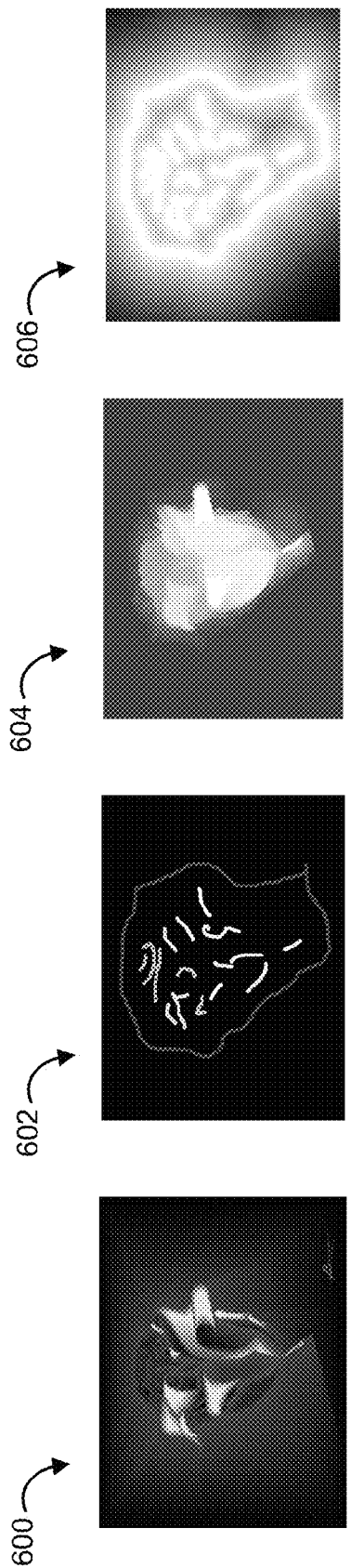
FIGS. 6A-6D show illustrative monoscopic input images, brushstroke input, dense scribble propagation and confidence map.

Referring now to FIGS. 5A-5B, illustrative monoscopic image 500 is shown in FIG. 5A, and a saliency map 550 of the monoscopic image 500 is shown in FIG. 5B. Saliency maps may be computed by detecting properties of the visual stimuli of the image, such as local discontinuities in intensity, color, and orientation. For example, in FIG. 5A, the eyes 504 and nose 506 of the seal are salient portions of the image. The saliency of these parts of the image can be detected because of the discontinuity between the light colored fur of the seal and the dark colored eyes and nose. In the resulting saliency map, shown in FIG. 5B, the portions of the image where the eyes 504 and nose 506 are located are shown with relatively high intensity as compared with the seal's body 508, and the seal's body is shown with relatively high intensity compared with the background 510. The varying intensity levels indicate the relative prominence of these features of the image.

In one example, the saliency map may be calculated according to a method from Goferman et al. [2010] (cited in the References section above) combined with a gradient magnitude term. Saliency information is used in a smoothness term used to direct errors in the disparity hypothesis to discontinuity locations. This preserves object structure while minimizing visual artifacts. The smoothness term is also used to determine which parts of a scene can be stretched to fill disocclusions.

In an interface similar to the GUI of FIG. 3, the user may edit saliency map 550 using an input device such as graphical input device 114. For example, the user may modify the saliency map image using brushstroke input, such as "dodge" and "burn" brushstroke input, to lighten or darken, respectively, selected areas of the saliency map image. For example, if the seal's mouth 512 was considered to be a high saliency part of the image, and the mouth did not appear as a high saliency area of the saliency map 550, the intensity of the mouth area of the saliency map 550 could be modified with brushstroke input to indicate that the mouth is a high saliency feature.

2D-to-3D Conversion Algorithm

A detailed discussion of the 2D-to-3D conversion follows. The goal of the approach described herein is to map input image I into a stereoscopic pair $I^l$, $I^r$ (l and r indicate left and right). To do this, two image warps $\Omega^l$ and $\Omega^r$ are computed, where $\Omega: IR^2 \to IR^2$ is a mapping such that for image I, $\Omega(I)=I'$ where $I'$ is the warped image. When creating a stereo pair from a single image, only horizontal disparities are introduced between $I^l$ and $I^r$, as vertical disparity can cause visual fatigue and difficulty in fusing the stereo pair. Therefore, the warp $\Omega$ modifies only x coordinates, which has the additional advantage of reducing the complexity of the algorithm. For simplicity, subscripts are defined as the value at that pixel; so $I_i$ is the image color at pixel i, and $\Omega_i$ is the x coordinate of the warp. To find $\Omega$, an energy minimization problem is defined that includes a data term $E_d$, enforcing stereo disparity at each pixel, and discontinuity preserving smoothness terms $E_s^l$, $E_s^l$ that preserve visual appearance. These are combined with a hole filling method that stretches backgrounds to fill discontinuities. In some approaches, one of the image warps can be fixed or computed to be an identity warp (or skipped), so that the warped image I' is the same as image I. The other image warp would then address the 3D shifts to form the second image of the stereoscopic pair. In an illustrative example in which one of the image warps is fixed, $\Omega^l(I)=I$ and $\Omega^r(I)=I'$. In other approaches, the warping is evenly allocated between the warps $\Omega^l$ and $\Omega^r$ or some other division is used.

1. Disparity Hypothesis

Users provide a sparse and rough scribble map M, such as the brushstroke input depth cues shown in FIG. 3. Higher intensities may be used to indicate "closer" objects, and lower intensities may be used to indicate "distant" objects. Brushstroke depth cues are propagated into a per-pixel set of soft constraints using a global joint sparse data interpolation technique. A dense scribble propagation U is computed, such that the difference between the value at $U_i$ and a weighted sum of its neighbors is minimized for each pixel i:

$$\arg_U \min \Sigma_{i \notin M} \Sigma \|U_i - \Sigma_{q \in N(i)} w_{iq} U_q\|^2 + {}_{i \in M}\Sigma \|U_i - M_i\|^2 \quad (1)$$

where N(i) are the neighbors of pixel i, and $w_{iq}$ is a weighting function that sums to one and is large when $I_i$ and $I_q$ are similar. User brushstroke input ("scribbles") may be sparsely placed, not only spatially, but also temporally at keyframes, propagating values across an entire video sequence by including temporal as well as spatial neighbors in Eq. (1).

A confidence weight C may be incorporated into the propagated scribble propagation U, which is computed as a distance transform of M. The confidence term allows for the scribble propagation to have a lower contribution to the resulting warp in areas that are more likely to be incorrect (farther from any user input). FIGS. 6A-6D show illustrative monoscopic input images (I) at 600; brushstroke input (M) at 602; dense scribble propagation (U) at 604; and confidence map (C), the distance transform to nearest scribble, at 606.

User scribbles indicate a rough concept of "closeness." These values are mapped into a pleasant stereo disparity range, using a disparity operator $\phi$ that adheres to the rules of stereography. Any nonlinear operators $\phi$ could be used, allowing for stereographic rules to be easily enforced. A simple linear operator $\phi$ that maps scribbles into a comfortable minimum and maximum disparity range, based on the image size, expected display size and viewer distance, may be used. The final per-pixel user input disparity hypothesis D is written as $$E < \phi(U) \quad (2)$$

This is used to construct the data term ($E_d$) of a minimization problem that ties together spatial warps $\Omega^r$ and $\Omega^l$, and enforces a confidence weighted disparity for each pixel i:

$$E_d = {}_i\Sigma C_i \|(\Omega_i^r - \Omega_i^l) - D_i\|^2 \quad (3)$$

Minimizing this error term with respect to $\Omega^r$, $\Omega^l$ results in a simple forward mapping operator, where each pixel moves relative to its disparity. This would enforce that the disparity between $I^l$, $I^r$ be exactly the disparity hypothesis D, but would introduce visual artifacts at locations with any errors in D, as well as holes in the result.

2. Discontinuity Preserving Smoothness

To fix these problems, a piecewise-continuous disparity assumption is enforced by introducing a discontinuity preserving, visual saliency-weighted smoothness term, $E_s$. The purpose of the smoothness term is twofold. First, it directs errors in the hypothesized depth to discontinuity locations, preserving object structure, while minimizing visual artifacts. In addition, it determines which parts of a scene can be most stretched for filling holes.

Incorporating a discontinuity preserving term in a 2D-to-3D conversion process allows for objects to "pop out" from the scene. Smoothness term $E_s$, penalizes local distortions, weighted by the saliency S, except at discontinuity locations, which are represented by a binary edge map G. Saliency is discussed with reference to FIGS. 5A-5B and an illustrative saliency map is shown at FIG. 5B. Edge detection is discussed with reference to FIGS. 4A-4C and an illustrative edge map is shown at FIG. 4B.

Discontinuities between neighbor pixels q∈N(i) are incorporated as an additional weight $\delta_{iq}$ on the smoothness constraint using the following formulation:

$$\delta_{iq} = \begin{cases} \varepsilon & \text{if } i, q \in G \\ 1 & \text{otherwise} \end{cases} \quad (4)$$

Using a small, non-zero ∈ is advantageous as it yields visually similar results to zero weight, but does not decrease the rank of the coefficient matrix in our linear solve, regardless of the location or number of discontinuities. For example, a value of ∈=0.001 may be used.

Figure 7A:
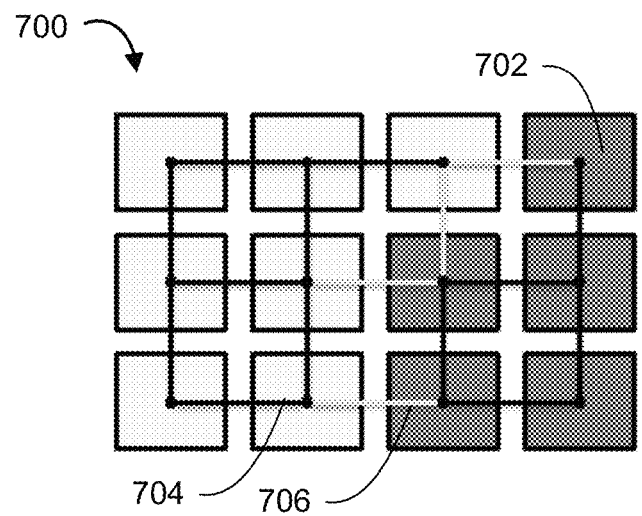
FIGS. 7A-7B show an illustrative pixel grid, before warping and after warping.
Figure 7B:
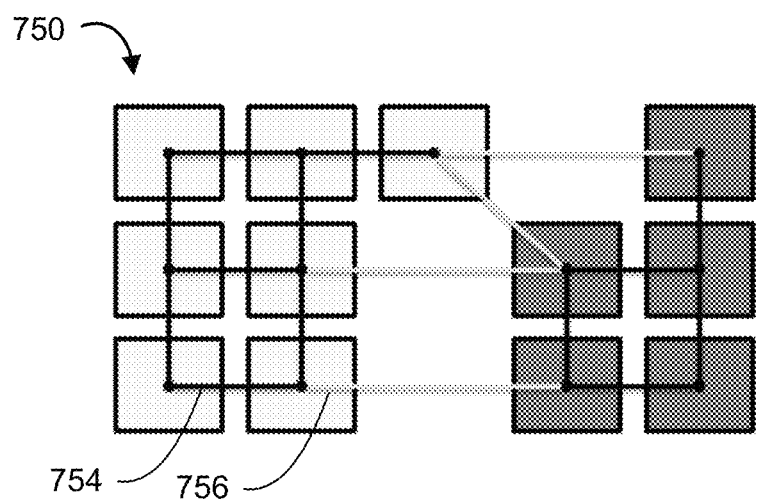

Diagrams illustrating the effect of the discontinuity preserving smoothness term are shown at FIGS. 7A-7B. Pixel grids 700 and 750 are made up of pixels such as pixel 702. FIGS. 7A-7B show a pixel grid before warping (700) and after warping (750). Lines connecting pixel centers indicate edges $\delta_{iq}$. Black lines, such as the lines shown at 704 and 754, indicate standard edges ($\delta_{iq}=1$). Grey lines, such as the lines shown at 706 and 756, indicate edges at potential discontinuity locations ($\delta_{iq}=\varepsilon$). In the illustrative example, potential discontinuities exist between the darker pixels on the right and the lighter pixels on the left. The warping occurs along the edges at potential discontinuity locations, as illustrated at 750.

The discontinuity preserving smoothness term is evaluated similarly for both left and right warps, $$E_s = \Sigma_i S_i (\Sigma_{q \in N(i)} \Sigma \delta_{iq} \|(\Omega_q - \Omega_i) - \Delta_x(i,q)\|^2) \quad (5)$$

where, $\Delta_x$ (i, q) is the x distance between i and q in the original image.

Ideally, all discontinuities match real depth edges in the image, but the problem of distinguishing depth edges from image edges in a single view is a highly under-constrained problem. To determine locations for discontinuities in G, the user brushstroke input and disparity hypothesis D help disambiguate depth edges and image edges. Image edges in G that exist where there is no change in D will not produce discontinuities in the final result, as the data term will be similar on both sides of the edge. In addition, at locations where depth edges exist in the absence of image edges (such as two white walls at different depths with the same albedo & lighting) it may be less crucial to model discontinuities, due to a lack of features for stereo fusion. Therefore, the algorithm is robust in terms of excess edges in G, and an over-detection of image edges may be used as an initial guess of discontinuity locations. The edges may be computed using a gradient magnitude edge detection method. The robustness to over-detection of this approach is illustrated in FIGS. 4A-4C. G can also be modified by the user.

To solve for $\Omega^l, \Omega^r$, data term $E_d$ and discontinuity preserving smoothness term $E_s$ are minimized. The stereo per-pixel disparity of the resulting synthesized stereo pair can also be computed: $D_i' = \Omega_i^r - \Omega_i^l$. $D' \neq D$, as the output disparity D' is computed considering the smoothness term $E_s$. In the resulting stereo pair $\Omega^l(I), \Omega^r(I)$, overlaps and disocclusions will occur at depth discontinuities. In the case of overlaps, output disparity D' may be used to determine correct ordering, however, disocclusions still need to be addressed.

3. Hole Filling

A common problem with image-based view synthesis is the need to fill disocclusions that arise from parallax. Traditionally, these regions are filled by hallucinating content. However, the locally varying warping framework described herein is designed to solve the hole filling problem using an approach motivated by recent advances in image retargeting, demonstrating that large changes of aspect ratio can be hidden by use of visual saliency. Different parts of the image are stretched and squeezed in a way that hides distortions in less salient regions. The described approach fills background content, enforcing a globally optimal content-and-disparity-aware stretching of nearby image content.

Solving for a final, hole filled warp $\hat{\Omega}^l, \hat{\Omega}^r$ is done by first computing a new set of discontinuity weights $\hat{\delta}_{iq}$, for all i, q∈G, such that the penalty for local distortion at disoccluded edges is reinstated:

$$\hat{\delta}_{iq} = \begin{cases} \delta_{iq} & \text{if } i, q \text{ form an overlap} \\ 1 & \text{otherwise} \end{cases} \quad (6)$$

The locations are fixed at discontinuity location $\hat{\Omega}_i = \Omega_i$ if i is in front of q (or in other words, $D_i' < D_q'$).

Figure 8:
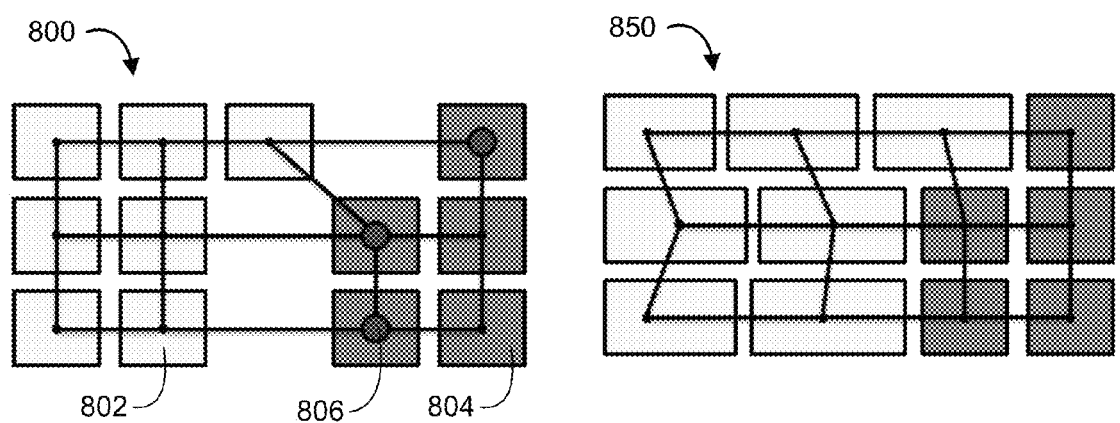
FIG. 8 shows an illustrative pixel grid, before hole filling and after hole filling.
Figure 9:
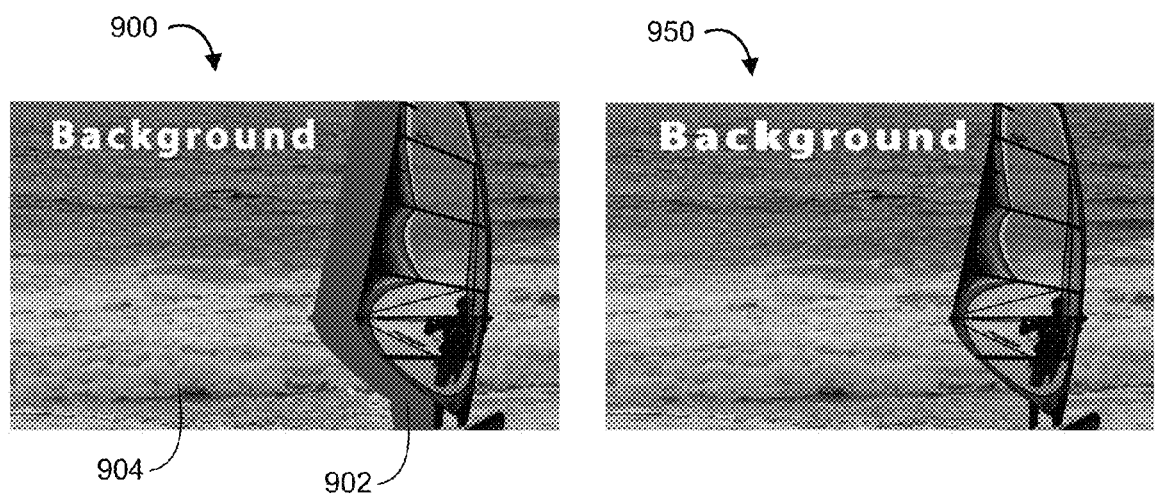
FIG. 9 shows an illustrative example of image stretching for hole filling.

This serves to "pull-over" neighboring content to the border of the disoccluded region, while preserving the location of the foreground object. Simultaneously, the smoothness term $E_s$ acts to direct distortions to the visually less significant areas, and the data term $E_d$ maintains the stereoscopic relationship between left and right images in stretched regions. FIG. 8 shows a diagram of how this looks on a per pixel level for a single view, and FIG. 9 shows an example result on an image. Minimizing $Ed_s$ and $E_s$ with new $\hat{\delta}$ and fixed locations yields $\Omega^l, \Omega^r$.

Referring to FIG. 8, a pixel grid is shown before hole filling (800) and after hole filling (850). In FIG. 8, a disocclusion occurs between light pixels, such as pixel 802, and dark pixels, such as pixel 804. In the illustrative diagram, dark pixels are shown in front. Pixels on the foreground of the disocclusion are fixed, as shown by circles 806, and the weights of all edges are restored to $\hat{\delta}_{iq}=1$. After hole filling, as shown in pixel grid 850, the image is stretched to fill the disocclusion.

Referring to FIG. 9, an illustrative example of image stretching for hole filling is shown. In image 900, a disoccluded section 902 is shown. The background content 904 is stretched to fill the disoccluded area, as shown in image 950.

This solution produces compelling hole filling results, maintaining image appearance and disparities in a least squares optimal sense. In addition, it creates valid monocular cues at disoccluded regions (which help with stereo fusion).

4. Error Minimization

As has been described, solving for optimal warps requires three separate minimization steps. The first, to propagate the scribbles and solve for D, the second to solve for $\Omega^l, \Omega^r$ (with discontinuities), and the third to create the final output $\hat{\Omega}^l, \hat{\Omega}^r$ after hole filling. However, these three stages can be combined into the same step. First, the scribble propagation from equation (1) is combined with the data term from equation (3). This is accomplished by replacing U with disparities $(\Omega_i^r - \Omega_i^l)$, essentially minimizing the difference in disparity between neighbor pixels, rather than the difference in scribble color.

$$E_d' = \Sigma_{i \notin M} C_i \|(\Omega_i^r - \Omega_i^l) - \Sigma_q w_{iq} (\Omega_q^r - \Omega_q^l)\|^2 + _{i \in M} \Sigma \|(\Omega_i^r - \Omega_i^l) - \phi(M_l)\|^2 \quad (7)$$

The final minimization can now be expressed as:

$$\arg_{\Omega^l, \Omega^r} \min \|E_d' + w_s (E_s^l + E_s^r)\|^2 \quad (8)$$

In an illustrative example, $w_s$ may be a user-controllable weight (that may be interactively adjusted) to determine the amount of discontinuity preserving smoothness. Alternatively, $w_s$ may have a predetermined value, such as $w_s = 400$. From this, the disparity of the final synthesized image pair may be determined: $\hat{D}' = \hat{\Omega}^r - \hat{\Omega}^l$.

Hole filling may also be introduced into the same step by using positions dictated by D instead of D' to compute disocclusions and foreground pixel locations. This provides the computational advantage of a single minimization, but at the expense of some inaccuracy in locations where $D_i' \neq D_i$. In one approach, solving for $\Omega^l$, $\Omega^r$ and creating the output $\hat{\Omega}^l$, $\hat{\Omega}^r$ may be kept separate. In alternative approaches, higher performance may be achieved by creating a simple preview by combining all the states into the same step.

The implementation described herein also allows support for user-drawn line constraints, as well as temporal smoothness in $\Omega^l$, $\Omega^r$.

The error minimization in equation (8) is expressed as a linear system of equations Ax=b, and $\Omega$ is represented as a regularly structured, per-pixel grid. By phrasing the problem in these terms, a multi-scale GPU implementation that iteratively solves for x may be used, achieving interactive rates. At each stage, from coarse-to-fine resolution, each pixel i independently (and in parallel) solves for its local minimum given its neighbors q, and updates itself. This whole procedure may be iterated multiple times. Binary maps, such as the edge map G, are down-sampled using a maximum-filter prior to sub-sampling to prevent continuous lines from becoming disconnected.

5. Rendering

The final step is to render the stereo pair $I^l$ and $I^r$ from $\hat{\Omega}^l(I)$, $\hat{\Omega}^r(I)$. One exemplary approach uses a hardware-accelerated splatting method, which computes anisotropic pixel splats for each warped pixel and guarantees alias free high quality rendering.

The final warp may contain pixels that overlap each other. In these cases, the computed pixel disparity map $\hat{D}'$ may be used to disambiguate over/under regions and properly render occlusions.

The approach described herein preserves sub-pixel image boundaries at disocclusions, as the content-aware stretching is distributed over the image and not strictly at the boundary. At overlapped regions, some form of matting may be used. For example, a feathering technique on a small number of pixels may be used around overlaps. If high-quality alpha mattes are available, they can be incorporated into rendering when drawing foreground regions at overlapped areas.

CONCLUSION

An approach to 2D-to-3D conversion is described that may use one or more of user-provided depth cues, an edge map of the 2D image, and a saliency map of the 2D image to produce a stereoscopic pair of images. The user may iteratively modify the depth cues, edge map, and saliency map to achieve the desired 3D effect.

Further aspects can be envisioned to one of ordinary skill in the art after reading this disclosure. Combinations or sub-combinations of the above disclosure can be advantageously made. The example arrangements of components are shown for purposes of illustration and it should be understood that combinations, additions, re-arrangements, and the like are contemplated in alternative aspects of the present disclosure.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. In a computer-implemented image conversion system, a method for generating a stereoscopic pair of images from a monoscopic image, comprising:
   receiving, by a processor of the computer-implemented image conversion system, a monoscopic image;
   receiving, by an input device coupled to the processor, a first input, wherein the first input includes at least one brushstroke corresponding to a location in the monoscopic image;
   computing, by the processor, a saliency map of the monoscopic image;
   computing, by the processor, an edge map of the monoscopic image;
   computing, by the processor, a first image warp defining a movement of each pixel of the monoscopic image to create a first warped image of the stereoscopic pair of images; and
   computing, by the processor, a second image warp defining a movement of each pixel of the monoscopic image to create a second warped image of the stereoscopic pair of images;
   wherein each of the first and second image warps is computed using the at least one brushstroke, the saliency map, and the edge map; and
   generating, by the processor, the stereoscopic pair of images from the first image warp and the second image warp.

2. The method of claim 1, wherein receiving the first input comprises receiving the at least one brushstroke via a user interface, the user interface configured to receive a parameter associated with the at least one brushstroke, the parameter indicating a depth of an area in the monoscopic image.

3. The method of claim 2, wherein the parameter is an intensity of the brushstroke, wherein the intensity of the brushstroke corresponds to the depth of the area in the monoscopic image.

4. The method of claim 3, further comprising receiving a second input via the user interface, wherein the second input includes at least one brushstroke input to modify the saliency map.

5. The method of claim 4, further comprising receiving a third input via the user interface, wherein the third input includes at least one brushstroke input to modify the edge map.

6. The method of claim 5, further comprising:
   displaying a stereoscopic pair of images based on one or more of the first input, second input, or third input;
   receiving one or more of a modified first input, second input, or third input; and
   displaying a modified stereoscopic pair of images based on one or more of the modified first input, second input, or third input.

7. The method of claim 1, wherein computing an image warp comprises:
   minimizing a data term that uses the first input to define the horizontal movement of a pixel;
   minimizing a smoothness term that preserves discontinuity and is weighted by visual saliency, wherein the smoothness term uses a saliency map of the monoscopic image and an edge map of the monoscopic image; and
   filling disocclusions.

8. The method of claim 7, wherein filling disocclusions comprises stretching content that is proximate to a disoccluded region to a border of the disoccluded region.

9. The method of claim 7, wherein minimizing the data term, minimizing the smoothness term, and filling disocclusions occur in the same iterative process.

10. The method of claim 1, wherein computing the first image warp comprises computing an image warp wherein movement of each pixel of the monoscopic image is zero and the first warped image is equal to the monoscopic image.

11. A computer-implemented image conversion system for generating a stereoscopic pair of images from a monoscopic image, comprising:
   a processor for executing instructions and modifying stored data structures;
   memory for storing data structures;
   a display coupled to the processor;
   an input device, coupled to the processor, for providing a first input, wherein the first input includes at least one brushstroke corresponding to a location in the monoscopic image; and
   a module for:
      a) computing a saliency map of the monoscopic image;
      b) computing an edge map of the monoscopic image;
      c) computing a first image warp defining a movement of each pixel of the monoscopic image to create a first warped image of the stereoscopic pair of images
      d) computing a second image warp defining a movement of each pixel of the monoscopic image to create a second warped image of the stereoscopic pair of images;
      e) wherein each of the first and second image warps is computed using the at least one brushstroke, the salience map, and the edge map; and
      f) generating the stereoscopic pair from the first image warp and the second image warp.

12. The image conversion system of claim 11, further comprising a user interface configured to display the monoscopic image on the display and to receive a parameter associated with the at least one brushstroke, the parameter indicating a depth of an area in the monoscopic image.

13. The image conversion system of claim 12, wherein the parameter is an intensity of the brushstroke, wherein the intensity of the brushstroke corresponds to the depth of the area in the monoscopic image.

14. The image conversion system of claim 13, wherein the user interface is further configured to display the saliency map on the display and to receive a second input, wherein the second input includes at least one brushstroke input to modify the saliency map.

15. The image conversion system of claim 14, wherein the user interface is further configured to display the edge map on the display and to receive a third input, wherein the third input includes at least one brushstroke input to modify the edge map.

16. The image conversion system of claim 15, wherein the user interface is further configured to:
   display a stereoscopic pair of images on the display, the stereoscopic pair of images based on one or more of the first input, second input, or third input;
   receive one or more of a modified first input, second input, or third input; and
   display a modified stereoscopic pair of images on the display based on one or more of the modified first input, second input, or third input.

17. The image conversion system of claim 11, wherein computing the first image warp comprises computing an image warp wherein movement of each pixel of the monoscopic image is zero and the first warped image is equal to the monoscopic image.

18. A computer-readable medium, for use with a computer-implemented image conversion system, the computer-readable medium having stored thereon, in non-transitory form, program code executable by a processor coupled to the computer readable medium, the program code comprising:
   program code for receiving a monoscopic image;
   program code for receiving a first input, wherein the first input includes at least one brushstroke corresponding to a location in the monoscopic image;
   program code for computing a saliency map of the monoscopic image;
   program code for computing an edge map of the monoscopic image;
   program code for computing a first image warp defining a movement of each pixel of the monoscopic image to create a first warped image of the stereoscopic pair of images; and
   program code for computing a second image warp defining a movement of each pixel of the monoscopic image to create a second warped image of the stereoscopic pair of images;
   wherein each of the first and second image warps is computed using the at least one brushstroke, the saliency map, and the edge map; and
   program code for generating the stereoscopic pair from the first image warp and the second image warp.

19. The computer-readable medium of claim 18, wherein receiving the first input comprises receiving the at least one brushstroke via a user interface, the user interface configured to receive a parameter associated with the at least one brushstroke, the parameter indicating a depth of an area in the monoscopic image.

20. The computer-readable medium of claim 19, wherein the parameter is an intensity of the brushstroke, wherein the intensity of the brushstroke corresponds to the depth of the area in the monoscopic image.

21. The computer-readable medium of claim 19, further comprising program code for receiving a second input via the user interface, wherein the second input includes at least one brushstroke input to modify the saliency map.

22. The computer-readable medium of claim 21, further comprising program code for receiving a third input via the user interface, wherein the third input includes at least one brushstroke input to modify the edge map.

23. The computer-readable medium of claim 22, further comprising:
   program code for displaying a stereoscopic pair of images based on one or more of the first input, second input, or third input;
   program code for receiving one or more of a modified first input, second input, or third input; and
   program code for displaying a modified stereoscopic pair of images based on one or more of the modified first input, second input, or third input.

24. The computer-readable medium of claim 18, wherein computing an image warp comprises:
   program code for minimizing a data term that uses the first input to define the horizontal movement of a pixel;
   program code for minimizing a smoothness term that preserves discontinuity and is weighted by visual saliency, wherein the smoothness term uses a saliency map of the monoscopic image and an edge map of the monoscopic image; and
   program code for filling disocclusions.

25. The computer-readable medium of claim 24, wherein filling disocclusions comprises stretching content that is proximate to a disoccluded region to a border of the disoccluded region.

26. The computer-readable medium of claim 24, wherein minimizing the data term, minimizing the smoothness term, and filling disocclusions occur in the same iterative process.

27. The computer-readable medium of claim 18, wherein the program code for computing the first image warp comprises program code for computing an image warp wherein movement of each pixel of the monoscopic image is zero and the first warped image is equal to the monoscopic image.

* * * * *

UNITED STATES PATENT AND TRADEMARK OFFICE
CERTIFICATE OF CORRECTION

PATENT NO. : 8,666,146 B1
APPLICATION NO. : 13/353285
DATED : March 4, 2014
INVENTOR(S) : Aljosa A. Smolic et al.

It is certified that error appears in the above-identified patent and that said Letters Patent is hereby corrected as shown below:

In the Claims:

At column 14, line 32
　　Please remove "and"

At column 15, line 37
　　Please remove "images" and insert --images;--

At column 16, lines 17-18
　　Please remove "computer readable" and insert --computer-readable--

Signed and Sealed this
Third Day of June, 2014

Michelle K. Lee
*Deputy Director of the United States Patent and Trademark Office*